(12) United States Patent
Golling et al.

(10) Patent No.: US 11,225,298 B2
(45) Date of Patent: Jan. 18, 2022

(54) SEAT BENCH ARRANGEMENT FOR A MOTORCYCLE

(71) Applicant: Bayerische Motoren Werke Aktiengesellschaft, Munich (DE)

(72) Inventors: Adrian Golling, Groebenzell (DE); Mathias Muehlmann, Olching (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 92 days.

(21) Appl. No.: 16/754,816

(22) PCT Filed: Sep. 14, 2018

(86) PCT No.: PCT/EP2018/074848
§ 371 (c)(1),
(2) Date: Apr. 9, 2020

(87) PCT Pub. No.: WO2019/091632
PCT Pub. Date: May 16, 2019

(65) Prior Publication Data
US 2021/0188379 A1   Jun. 24, 2021

(30) Foreign Application Priority Data
Nov. 13, 2017   (DE) .................... 10 2017 220 119.3

(51) Int. Cl.
*B62J 1/12* (2006.01)
*B62J 9/25* (2020.01)
(Continued)

(52) U.S. Cl.
CPC . *B62J 1/12* (2013.01); *B62J 1/04* (2013.01); *B62J 9/25* (2020.02); *B62J 35/00* (2013.01)

(58) Field of Classification Search
CPC ......... B62J 1/12; B62J 1/04; B62J 9/25; B62J 35/00
See application file for complete search history.

(56) References Cited

U.S. PATENT DOCUMENTS 2,330,341 A   9/1943   Du Pont et al.
4,347,909 A   9/1982   Takemura et al.
(Continued)

FOREIGN PATENT DOCUMENTS

CN   102627129 A   8/2012
CN   103287529 B   11/2014
(Continued)

OTHER PUBLICATIONS

International Search Report (PCT/ISA/210) issued in PCT Application No. PCT/EP2018/074848 dated Dec. 21, 2018 with English translation (five (5) pages).
(Continued)

*Primary Examiner* — Tony H Winner
*Assistant Examiner* — Michael R Stabley
(74) *Attorney, Agent, or Firm* — Crowell & Moring LLP

(57) ABSTRACT

A seat bench arrangement for a motorcycle is provided, with a tank bearing which is designed for connecting a tank bladder to a vehicle structure, and a seat bench for receiving a motorcyclist. The seat bench is connected to the tank bearing such that the tank bearing forms a bearing for supporting the seat bench.

11 Claims, 2 Drawing Sheets

(51) Int. Cl.
*B62J 1/04* (2006.01)
*B62J 35/00* (2006.01)

(56) References Cited

U.S. PATENT DOCUMENTS

| | | | | |
|---|---|---|---|---|
| 4,413,700 | A | * | 11/1983 | Shiratsuchi .............. B62J 17/00 180/219 |
| 4,416,348 | A | * | 11/1983 | Fukui ....................... B62J 17/00 180/210 |
| 4,469,190 | A | * | 9/1984 | Yamaguchi .............. B62J 35/00 137/575 |
| 4,577,719 | A | * | 3/1986 | Nomura .................... B62J 1/12 180/219 |
| 2009/0194355 | A1 | | 8/2009 | Yamamoto et al. |
| 2015/0061334 | A1 | | 3/2015 | Inoue et al. |
| 2016/0046344 | A1 | | 2/2016 | Ishii et al. |

FOREIGN PATENT DOCUMENTS

| | | |
|---|---|---|
| DE | 690 428 | 4/1940 |
| DE | 30 26 789 A1 | 2/1981 |
| DE | 20 2004 017 603 U1 | 12/2004 |
| FR | 2 760 714 A | 9/1998 |
| GB | 2 405 128 A | 2/2005 |
| JP | 1-314679 A | 12/1989 |
| JP | 3048584 B2 | 6/2000 |
| JP | 2001-233270 A | 8/2001 |
| JP | 2015-174553 A | 10/2015 |
| TW | I 335887 B | 1/2011 |
| WO | WO 98/41440 A1 | 9/1998 |
| WO | WO 2010/013480 A1 | 2/2010 |

OTHER PUBLICATIONS

German-language Written Opinion (PCT/ISA/237) issued in PCT Application No. PCT/EP2018/074848 dated Dec. 21, 2018 (six (6) pages).
German-language Search Report issued in German Application No. 102017220119.3 dated Jun. 19, 2018 with partial English translation (13 pages).
Chinese-language Office Action issued in Chinese Application No. 201880066135.4 dated Dec. 31, 2020 with English translation (18 pages).
Chinese-language Office Action issued in Chinese Application No. 201880066135.4 dated Jul. 29, 2021 with English translation (11 pages).

\* cited by examiner

SEAT BENCH ARRANGEMENT FOR A MOTORCYCLE

BACKGROUND AND SUMMARY OF THE INVENTION

The invention relates to a seat bench arrangement for a motorcycle and to a correspondingly equipped motorcycle.

In the case of known motorcycles, a seat bench for one or more users is usually arranged behind the fuel tank in a longitudinal direction of the motorcycle. The seat bench is connected via separate seat bench mountings to the vehicle structure, the main frame of the motorcycle, and is usually of foldable configuration, with the result that the seat bench can be folded open about a rotational axis which is arranged at a front end of the seat bench. In this way, a stowage compartment is accessible which is provided below the seat bench and in which luggage or a protective helmet can be stowed as required.

The installation space in the region is usually very scarce, however, since the seat bench mountings have to be connected firstly to the seat bench and secondly to the vehicle frame, without colliding with the tank, however. At the same time, they have to be sufficiently dimensioned, in order to provide a sufficiently stable connection to the vehicle structure.

The fuel tank itself is usually fastened to the vehicle structure by way of a dedicated tank mounting.

It is an object of the invention to provide an improved connection of the seat bench to the vehicle structure, which connection as far as possible at least reduces the disadvantages.

This object is achieved by way of a seat bench arrangement and by way of a motorcycle according to the claimed invention.

Accordingly, a seat bench arrangement for a motorcycle is provided, having a tank mounting which is configured for connecting a fuel cell to a vehicle structure, and a seat bench for receiving a motorcycle user. The seat bench is connected to the tank mounting, with the result that the tank mounting forms a mounting for supporting the seat bench.

This means that the tank mounting is firstly configured for connecting the fuel cell to the vehicle structure, but secondly also serves as a mounting for the seat bench. A fuel cell is to be understood to mean, in particular, a container which defines a cavity and in which, for example, a fuel for operating the motorcycle can be carried. The fuel cell can either be a tank container which is encased at least partially by way of an additional trim panel, or else can be a non-covered tank.

In the installed state, the tank mounting is therefore connected not only to the vehicle structure, but rather additionally to the seat bench, with the result that the seat bench is mounted on the vehicle structure via the tank mounting. In the installed state, the tank mounting therefore forms the (indirect) connection between the two components. This affords the great advantage that a corresponding seat bench mounting can be dispensed with at least in the region of the tank mounting, since it is already integrated into the tank mounting. An amount of installation space which is required for fastening all the components can be reduced considerably in this way, and therefore a functional integration can be achieved. It goes without saying that the seat bench can nevertheless have further seat bench mountings, in particular in sections of the seat bench which are spaced apart herefrom.

Moreover, an improved fit accuracy is achieved in this way, in addition to the described advantageous functional integration. The tolerances which are to be managed only with high complexity in the case of previous solutions with a separate seat bench mounting are thus bypassed, which tolerances are disruptively discernible by way of in part wide and irregular joints between the tank and the seat bench. Instead, as a result of the connection of the tank mounting and the seat bench, exact positioning with respect to one another is fixed, with the result that a high fit accuracy can be ensured.

To this end, for example, the tank mounting can comprise a first connecting section which is configured for connecting to the fuel cell, and a second connecting section, the seat bench being connected to the second connecting section of the tank mounting by means of a third connecting section which is assigned to the seat bench.

The third connecting section can optionally be connected rotatably to the second connecting section of the tank mounting, in order to connect the seat bench to the tank mounting in a rotationally movable manner. This makes it possible to fold the seat bench open into an open position as required, and to make a stowage space which is arranged below the seat bench accessible. Conversely, the seat bench can be folded closed from the open position into a closed position again in order to use the motorcycle.

Furthermore, the first connecting section of the tank mounting can be connected to the fuel cell in a positively locking, integrally joined and/or non-positive manner. For example, in the case of a positively locking connection, the tank mounting can have recesses, projections and/or undercuts in the region of the first connecting section, with the result that, in the case of a production of the fuel cell with the use of a blow molding process, the fuel cell extends accordingly around or into the elements, in order thus to produce the positively locking connection. Thus, in order to produce a blow molded tank which comprises the tank mounting and the fuel cell, the tank mounting can be provided, for example, as an individual injection molded component, and can be inserted into an injection molding die in order to carry out the blow molding process.

In this way, a connection is already produced between the tank mounting and the fuel cell within the context of the blow molding process, for example via one or more positively locking connections between the fuel cell and the tank mounting.

In accordance with one embodiment, the second connecting section can comprise a receptacle, and the third connecting section can comprise a mounting shaft, the mounting shaft being arranged in the receptacle, preferably being arranged in a releasable and/or rotationally movable manner. This means that the mounting shaft is assigned to the seat bench, and is arranged and held in the receptacle. If the connection is additionally of releasable configuration, the seat bench can be removed easily if required, without requiring comprehensive dismantling. In the case of an alternative or additional rotationally movable configuration, the described folding capability of the seat bench can be provided.

In accordance with an alternative embodiment, the second connecting section can comprise a mounting shaft, and the third connecting section can comprise a receptacle, the mounting shaft being arranged in the receptacle, preferably being arranged in a releasable and/or rotationally movable manner.

In this case, the mounting shaft is assigned to the tank mounting, and the receptacle is assigned to the seat bench.

In this embodiment, the releasable configuration also makes easy and simple removal of the seat bench possible. A rotatable connection of the seat bench to the tank mounting is likewise provided by way of the alternative or additional rotational movement which permits folding open and folding down in the same way.

In each of the cases, the respective receptacle can be configured as a recess, an undercut, and/or with a U-shaped cross section for receiving the mounting shaft, preferably for receiving the mounting shaft in a releasable and/or rotationally movable manner. In this way, a positively locking connection can be provided which can be released in order to remove the seat bench as required. In each of the described embodiments, the receptacle makes it possible to center the seat bench with respect to the tank mounting, and to ensure an exact and reproducible position in a vehicle longitudinal direction and a vehicle width direction.

Likewise independently of the embodiment, the mounting shaft can comprise one or more mounting elements which are arranged on the mounting shaft, in particular elastic seat bench buffers. The mounting elements are arranged, for example, between the mounting shaft and the receptacle. In the case of an elastic configuration, the mounting elements serve additionally as a damping means, in order to at least reduce a transmission of vibrations and jolts from the vehicle via the tank mounting to the seat bench. To this end, the seat bench buffers can be manufactured, for example, from rubber or another elastic material.

To this end, for example, the mounting elements are in each case of cylindrical configuration and are arranged coaxially with respect to an axis of symmetry of the mounting shaft.

For an additional damping effect, moreover, the tank mounting can be connected to the vehicle structure in a decoupled or vibrationally damped manner, for example via buffers which are arranged in between. Therefore, a two-stage damping action can be achieved in the case of the merely optional combination with the elastic seat bench buffers.

Moreover, the second connecting section can be arranged on a side of the tank mounting, which side faces away from the first connecting section. This means that, in a vehicle longitudinal direction, the tank mounting is arranged behind the fuel cell, and the seat bench is in turn arranged substantially behind the tank mounting. Accordingly, the first connecting section faces in the direction of the fuel cell, in order to provide a connection to the latter. In contrast, the second connecting section points in the opposite direction, that is to say in the direction of the seat bench.

For example, the third connecting section is arranged in a front region of the seat bench, which front region faces the tank mounting and/or the fuel cell.

For example, the first and/or the second connecting section are likewise configured in one piece with the tank mounting. In this way, a particularly compact and functionally integrated unit, the tank mounting, is achieved. For example, the tank mounting can be produced as an injection molded component, with the result that the two connecting sections can be integrated into the one component in a simple way.

Furthermore, the tank mounting can comprise, moreover, a fastening section, preferably at least one eyelet, which is configured for fastening a luggage container to the tank mounting in a region above the fuel cell. This affords the possibility that, in addition to the connection to the seat bench, the tank mounting is also configured, moreover, for connecting to the luggage container. For example, the luggage container can be a tank bag or a similar container.

Moreover, a motorcycle having a seat bench arrangement is provided, the seat bench arrangement being configured in accordance with the description, and the tank mounting being connected fixedly to the vehicle structure.

The described tank mounting and the seat bench arrangement which is made possible as a result afford the advantage that the tank mounting is configured as merely a single component, and up to three integrated functions can be provided. Thus, the fastening of the tank to the vehicle structure, the fastening of the seat bench, and an integrated holder for the tank bag are provided. In this way, an improved utilization of the installation space which is in any case very scarce can take place. Moreover, this makes it possible to save costs and weight. A further advantage is achieved by virtue of the fact that the seat bench is decoupled from the vehicle structure and damped in a double way in comparison with known connecting arrangements, with the result that a considerable improvement of a damping effect of vibration loading of the user can be achieved by way of this.

Within the context of this description, a motorcycle is to be understood to mean not only motorcycles per se but rather also motorcycle-like vehicles, in particular all single track vehicles, but also multiple track vehicles in each case with a corresponding saddle-shaped seat bench for the user, particularly preferably two wheeled, three wheeled or four wheeled motor scooters or scooters, but also quad bikes.

The invention will be described in greater detail in the following text on the basis of two embodiments with reference to the drawings.

DETAILED DESCRIPTION OF THE DRAWINGS

Figure 1:
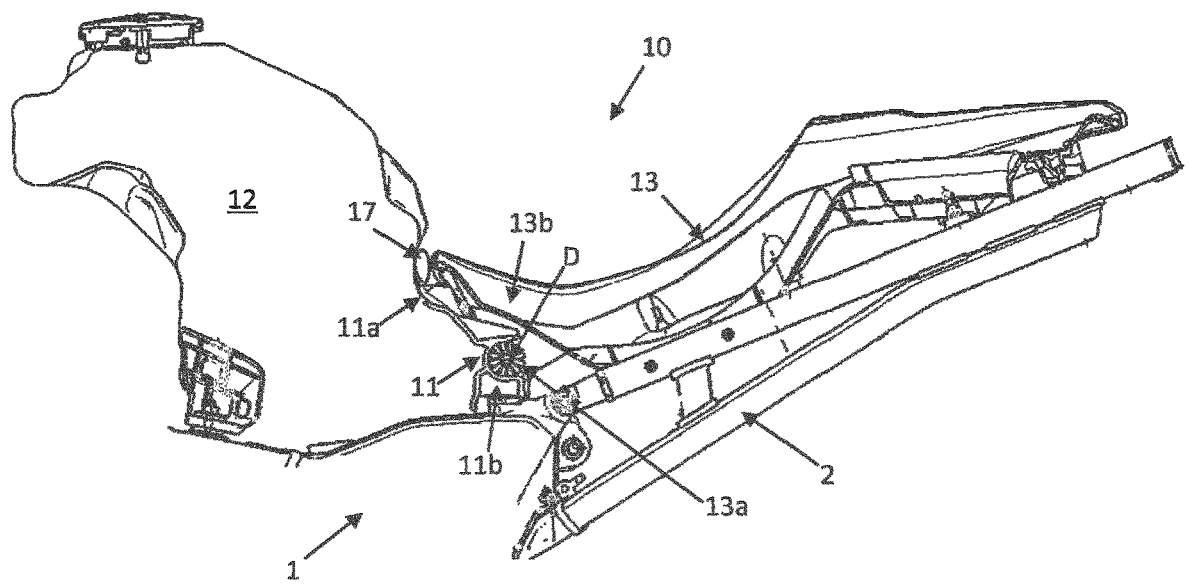
FIG. 1 is a side view of a seat bench arrangement in accordance with the description.

FIG. 1 shows a side view of a first embodiment of a seat bench arrangement 10 for a motorcycle 1. The motorcycle 1 itself is not shown in its entirety, but rather merely a part of a vehicle structure 2 of the motorcycle 1. The seat bench arrangement 10 comprises a tank mounting 11 which is configured for connecting a fuel cell 12 to the vehicle structure 2. The fuel cell 12 can either be a tank container which is additionally enclosed at least partially by way of an additional trim panel, or else a non-covered tank.

Furthermore, the seat bench arrangement 10 comprises a seat bench 13 for receiving a motorcycle user (not shown), the seat bench 13 being connected to the tank mounting 11, with the result that the tank mounting 11 forms a mounting for supporting the seat bench 13. The tank mounting 11 comprises a first connecting section 11a which is configured for connecting to the fuel cell 12, and a second connecting section 11b, the seat bench 13 being connected to the second connecting section 11b of the tank mounting 11 by means of a third connecting section 13a which is assigned to the seat bench 13. The third connecting section 13a is preferably connected rotatably to the second connecting section 11b of the tank mounting 11, in order to connect the seat bench 13 to the tank mounting 11 in a rotationally movable manner.

The second connecting section 11b is arranged on a side of the tank mounting 11, which side faces away from the first connecting section 11a. For a configuration which is as compact as possible, the first 11a and/or the second connecting section 11b can optionally be configured in one piece with the tank mounting 11. Both, that is to say the first 11a and the second connecting section 11b, are preferably configured in one piece with the tank mounting 11. Moreover, the first connecting section 11a of the tank mounting 11 can be connected to the fuel cell 12 in a positively locking, integrally joined and/or non-positive manner.

In contrast, the third connecting section 13a is arranged in a front region 13b of the seat bench 13, which front region 13b faces the tank mounting 11. Moreover, the third connecting section 13b is preferably positioned below a seat surface of the seat bench 13.

Figure 2:
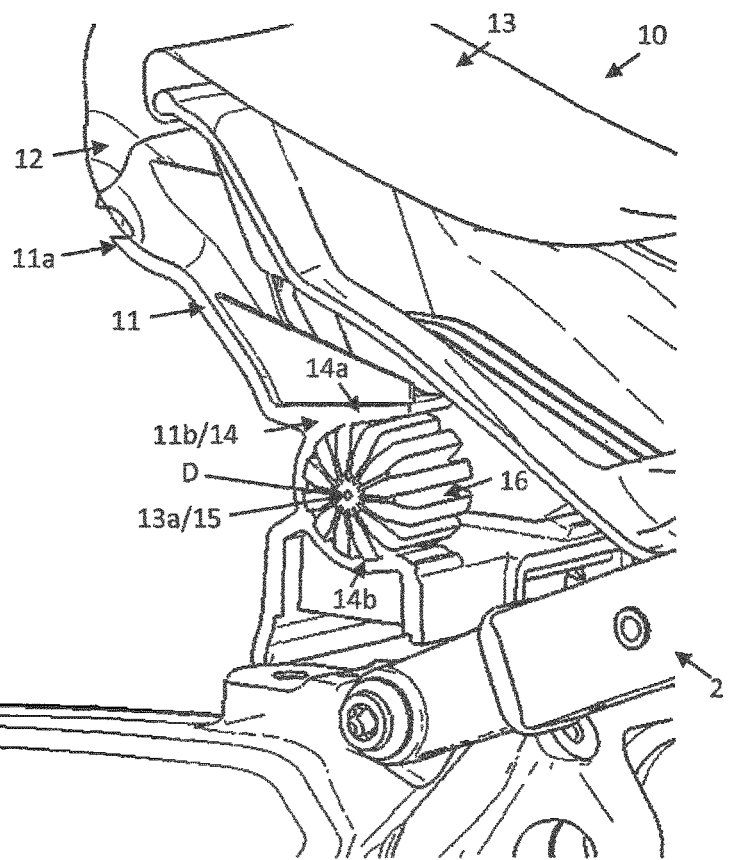
FIG. 2 is a first embodiment of the seat bench arrangement in a perspective detailed view.

FIG. 2 shows the first embodiment of the seat bench arrangement 10 from FIG. 1 in a perspective detailed view.

Here, the second connecting section 11b comprises a receptacle 14, and the third connecting section 13a comprises a mounting shaft 15, the mounting shaft 15 being arranged in the receptacle 14 such that it can be released as required and additionally can be moved rotationally. The mounting shaft 15 preferably defines the rotational axis D, about which the seat bench 13 can be rotated or pivoted. Here, the releasable connection is achieved by way of example by insertion of the mounting shaft 15 into the receptacle 14.

Figure 3:
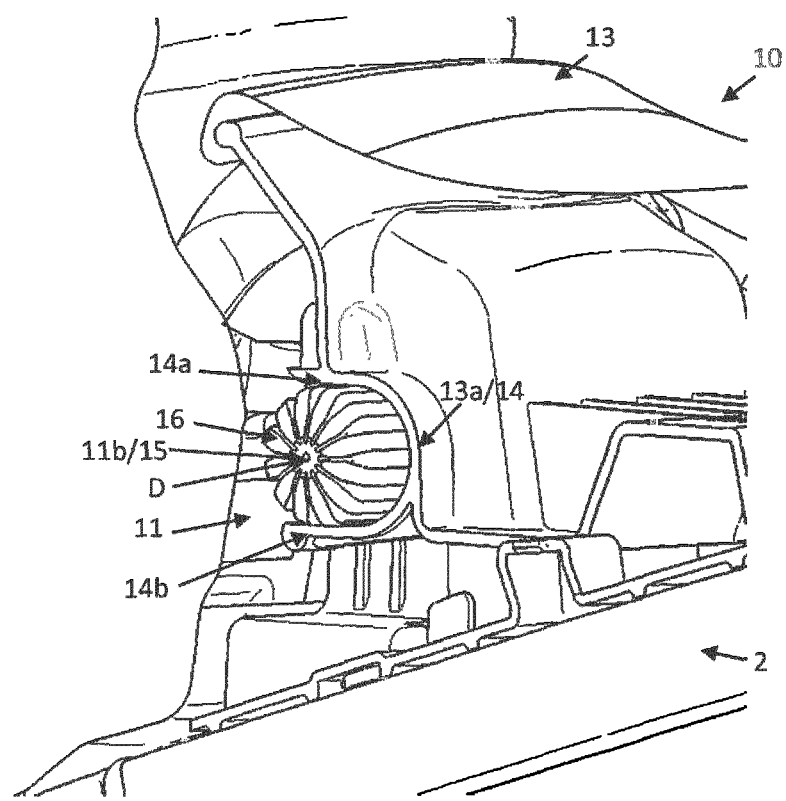
FIG. 3 is a second embodiment of the seat bench arrangement in a perspective detailed view.

FIG. 3 shows a second embodiment of the seat bench arrangement 10 in a perspective detailed view with a reversed arrangement. Here, the second connecting section 11b comprises a mounting shaft 15, and the third connecting section 13a comprises a receptacle 14, the mounting shaft 15 likewise being arranged in the receptacle 14 in a releasable and additionally rotationally movable manner. In this case, the mounting shaft 15 preferably also defines the rotational axis D, about which the seat bench 13 can be rotated or pivoted. Here, the releasable connection is achieved by way of example by insertion of the mounting shaft 15 into the receptacle 14.

In the two embodiments according to FIGS. 1, 2 and 3, the respective receptacle 14 comprises a substantially U-shaped cross section, with the result that a receiving space is defined between two limbs 14a, 14b of the U-shaped cross section, which receiving space is configured to receive the mounting shaft 15. On account of the shape of the receptacle 14, the latter is of easily releasable configuration, since the mounting shaft 15 can be easily inserted into the receptacle 14 and removed from the latter again. In addition, the geometric configuration of the receptacle 14 provides the possibility of rotatability.

To this end, in accordance with the first embodiment (FIGS. 1 and 2), the two limbs 14a, 14b are oriented in the vehicle longitudinal direction or in the direction of the seat bench 13, with the result that an opening likewise points in this direction. The seat bench 13 can therefore be connected simply to the tank mounting 11, by the mounting shaft 15 being introduced into the opening and, as a result, being positioned within the receiving space of the receptacle 14, which receiving space is defined by way of the U-shaped cross section.

In the second embodiment (FIG. 3), in contrast, the receptacle 14 is assigned to the seat bench 13. Accordingly, in this case, the two limbs 14a, 14b of the likewise U-shaped cross section are oriented in the vehicle longitudinal direction or in the direction of the tank mounting 11. The seat bench 13 is therefore connected to the tank mounting 11 by way of the U-shaped receptacle being placed onto the mounting shaft 15. The opening of the U-shaped cross section is therefore oriented substantially in the vehicle longitudinal direction or in the direction of the tank mounting 11 and the tank 12.

In every case, the mounting shaft 15 can comprise one or more mounting elements 16 which are arranged on the mounting shaft 15, in particular elastic seat bench buffers. Here, the mounting elements 16 are of substantially cylindrical configuration, and are arranged coaxially with respect to an axis of symmetry of the mounting shaft 15, longitudinally directed recesses forming a star-shaped cross section of the mounting elements 16. The mounting elements 16 thus make an effective damping function possible in order to reduce a transmission of vibrations from the remaining motorcycle to the seat bench 13.

As indicated merely diagrammatically in FIG. 1, the tank mounting 11 can, moreover, optionally comprise a fastening section 17 which is configured, for example, as one or more eyelets, and is configured for fastening a package container (not shown) to the tank mounting 11 in a region above the fuel cell 12.

What is claimed is:

1. A seat bench arrangement for a motorcycle, comprising:
    a tank mounting which is configured for connecting a fuel cell to a vehicle structure; and
    a seat bench for receiving a motorcycle user,
    wherein
    the seat bench is connected to the tank mounting such that the tank mounting forms a mounting for supporting the seat bench,
    the tank mounting includes a first connecting section configured for connecting to the fuel cell and a second connecting section,
    the seat bench is connected to the second connecting section of the tank mounting by a third connecting section which is assigned to the seat bench,
    the first connecting section of the tank mounting is connected to the fuel cell in a positively locking, integrally joined and/or non-positive manner,
    the second connecting section includes a receptacle and the third connecting section includes a mounting shaft, or the second connecting section includes the mounting shaft and the third connecting section includes the receptacle,
    the mounting shaft includes one or more mounting elements which are arranged on the mounting shaft,
    the mounting shaft is arranged in the receptacle, and
    the mounting elements are in each case of cylindrical configuration and are arranged coaxially with respect to an axis of symmetry of the mounting shaft.

2. The seat bench arrangement according to claim 1, wherein
    the third connecting section is connected rotatably to the second connecting section of the tank mounting, in order to connect the seat bench to the tank mounting such that the seat bench is movable rotationally.

3. The seat bench arrangement according to claim 1, wherein
    the respective receptacle is configured as a recess, an undercut, and/or with a U-shaped cross section for receiving the mounting shaft.

4. The seat bench arrangement according to claim 1, wherein
    the first and/or the second connecting section are configured in one piece with the tank mounting.

5. The seat bench arrangement according to claim 1, wherein
the third connecting section is arranged in a front region of the seat bench, which front region faces the tank mounting.

6. The seat bench arrangement according to claim 1, wherein
the respective receptacle is configured as a recess, an undercut, and/or with a U-shaped cross section for receiving the mounting shaft.

7. The seat bench arrangement according to claim 1, wherein
the arrangement is a releasable and/or rotationally movable arrangement.

8. A motorcycle, comprising:
a vehicle structure; and
a seat bench arrangement according to claim 1; wherein
the tank mounting is connected fixedly to the vehicle structure.

9. A seat bench arrangement for a motorcycle, comprising:
a tank mounting which is configured for connecting a fuel cell to a vehicle structure; and
a seat bench for receiving a motorcycle user,
wherein
the seat bench is connected to the tank mounting such that the tank mounting forms a mounting for supporting the seat bench,
the tank mounting includes a first connecting section configured for connecting to the fuel cell and a second connecting section,
the seat bench is connected to the second connecting section of the tank mounting by a third connecting section which is assigned to the seat bench, and
the second connecting section is arranged on a side of the tank mounting, which side faces away from the first connecting section.

10. A seat bench arrangement for a motorcycle, comprising:
a tank mounting which is configured for connecting a fuel cell to a vehicle structure; and
a seat bench for receiving a motorcycle user,
wherein
the seat bench is connected to the tank mounting such that the tank mounting forms a mounting for supporting the seat bench,
the tank mounting includes a first connecting section configured for connecting to the fuel cell and a second connecting section,
the seat bench is connected to the second connecting section of the tank mounting by a third connecting section which is assigned to the seat bench,
the first connecting section of the tank mounting is connected to the fuel cell in a positively locking, integrally joined and/or non-positive manner,
the second connecting section includes a receptacle and the third connecting section includes a mounting shaft, or the second connecting section includes the mounting shaft and the third connecting section includes the receptacle,
the mounting shaft includes one or more mounting elements which are arranged on the mounting shaft,
the mounting shaft is arranged in the receptacle, and
the mounting elements are elastic seat bench buffers.

11. A seat bench arrangement for a motorcycle, comprising:
a tank mounting which is configured for connecting a fuel cell to a vehicle structure; and
a seat bench for receiving a motorcycle user,
wherein
the seat bench is connected to the tank mounting such that the tank mounting forms a mounting for supporting the seat bench,
the tank mounting comprises a fastening section, which is configured for fastening a luggage container to the tank mounting in a region above the fuel cell, and
the fastening section is an eyelet.

* * * * *